Figure 1:
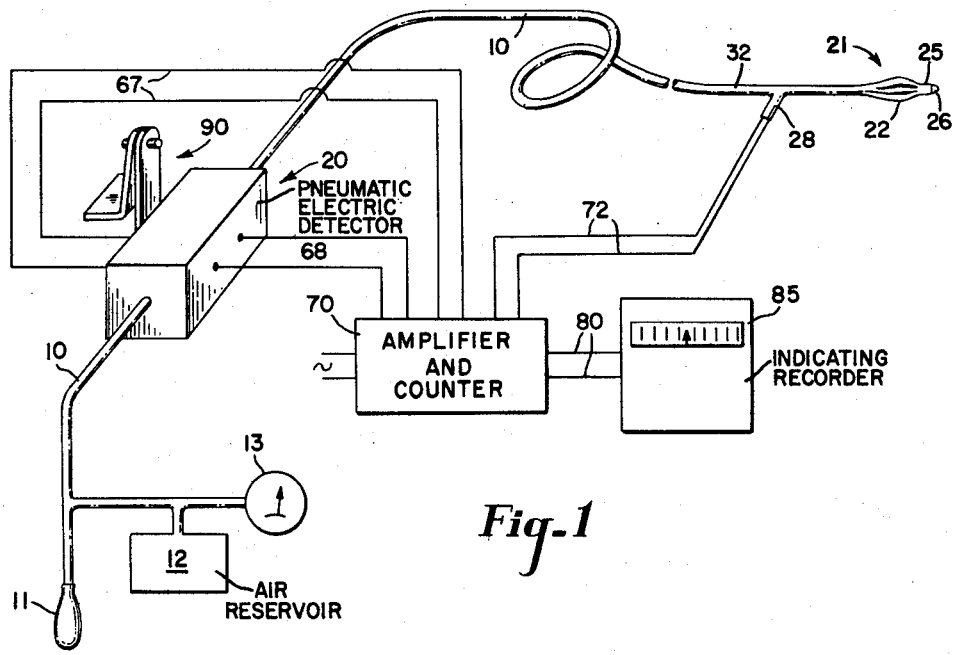

March 19, 1963 A. D. KOMPELIEN 3,081,765
MEDICAL BODY FUNCTION RECORDER
Filed June 15, 1960 2 Sheets-Sheet 1

INVENTOR.
ARLON D. KOMPELIEN
BY
*Joseph E. Ryan*
ATTORNEY

INVENTOR.
ARLON D. KOMPELIEN
BY Joseph E. Ryan
ATTORNEY

United States Patent Office 3,081,765
Patented Mar. 19, 1963

3,081,765
MEDICAL BODY FUNCTION RECORDER
Arlon D. Kompelien, Richfield, Minn., assignor to Minneapolis-Honeywell Regulator Company, Minneapolis, Minn., a corporation of Delaware
Filed June 15, 1960, Ser. No. 36,244
11 Claims. (Cl. 128—2)

My invention relates to a medical body function recording apparatus and primarily to apparatus of this type directed particularly to measuring respiratory rate and body temperature in a composite apparatus.

Apparatus of this type is known and used, and is generally applied to post-operative type patients where automatic, continuous recording of varying body functions for continuous observation of the patient's condition is required. Such recorders and associated apparatus are used for measuring and recording many body functions such as blood pressure, pulse rate, temperature, respiratory rate and the like. The present invention is directed primarily to a body function recorder for measuring respiratory rate and body temperature in a simple composite structure which is readily applied to a patient and permits a minimum of discomfort during critical recovery periods. This type of apparatus is used for continuous observation during such critical recovery periods wherein the patient's body is normally in a sedentary attitude. The apparatus provides an accurate measurement of respiratory rate and body temperature through a simple single sensing probe which is a rectal insert. The probe is actuated by muscular structure in the body in this region to be collapsed and expanded with breathing to actuate the respiratory rate sensor and permit rectal measurement of temperature to provide an accurate observation of these functions. The simplified apparatus with a single composite sensing element, together with the associated control apparatus operated thereby, provides for a minimum of equipment associated with the patient so as not to hinder his movement or breathing.

The present apparatus utilizes a combination of an electropneumatic probe and includes a thermistor. The probe operates into a pneumatic system to direct air therethrough and has incorporated therewith a flow detector and counter for counting flow reversal to indicate breathing or respiratory rate of the patient to which it is applied. Similarly, the thermistor located in the probe measures ambient temperature of the surrounding area to give an accurate measurement of the body temperature of the patient to whom the probe is applied.

It is therefore an object of this invention to provide a simplified and accurate medical body function recorder particularly adapted to the measurement of respiratory rate and body temperature.

Another object of this invention is to provide in a medical body function recorder an improved respiratory rate sensing and counting apparatus.

A further object of this invention is to provide in a medical body function recorder an improved respiratory rate sensing and recording apparatus utilizing a remotely positioned photoelectric detector and counter with a pneumatic system.

Still another object of this invention is to provide in a medical body function recorder a composite sensing apparatus which can be readily applied to a patient with a minimum of discomfort and hindrance to normal body activity.

Figure 2:
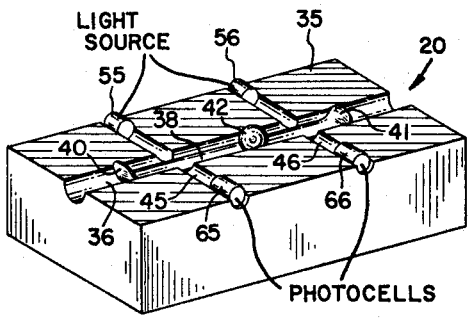
Figure 3:
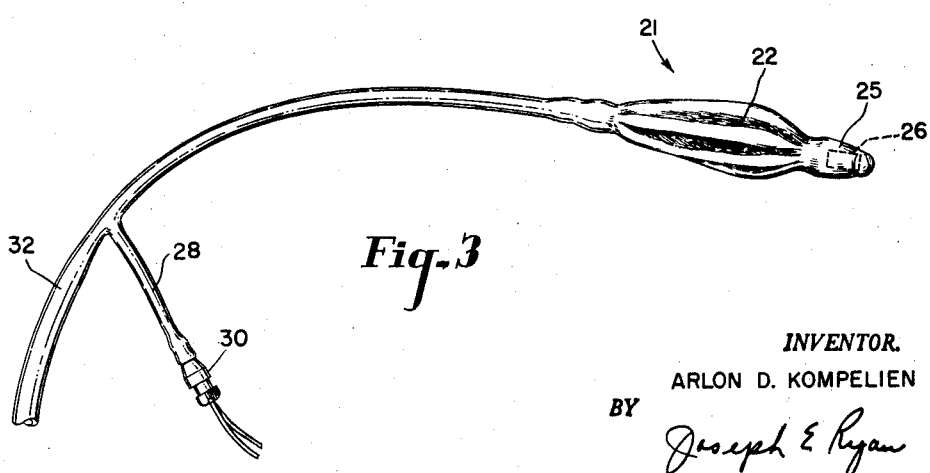
Figure 4:
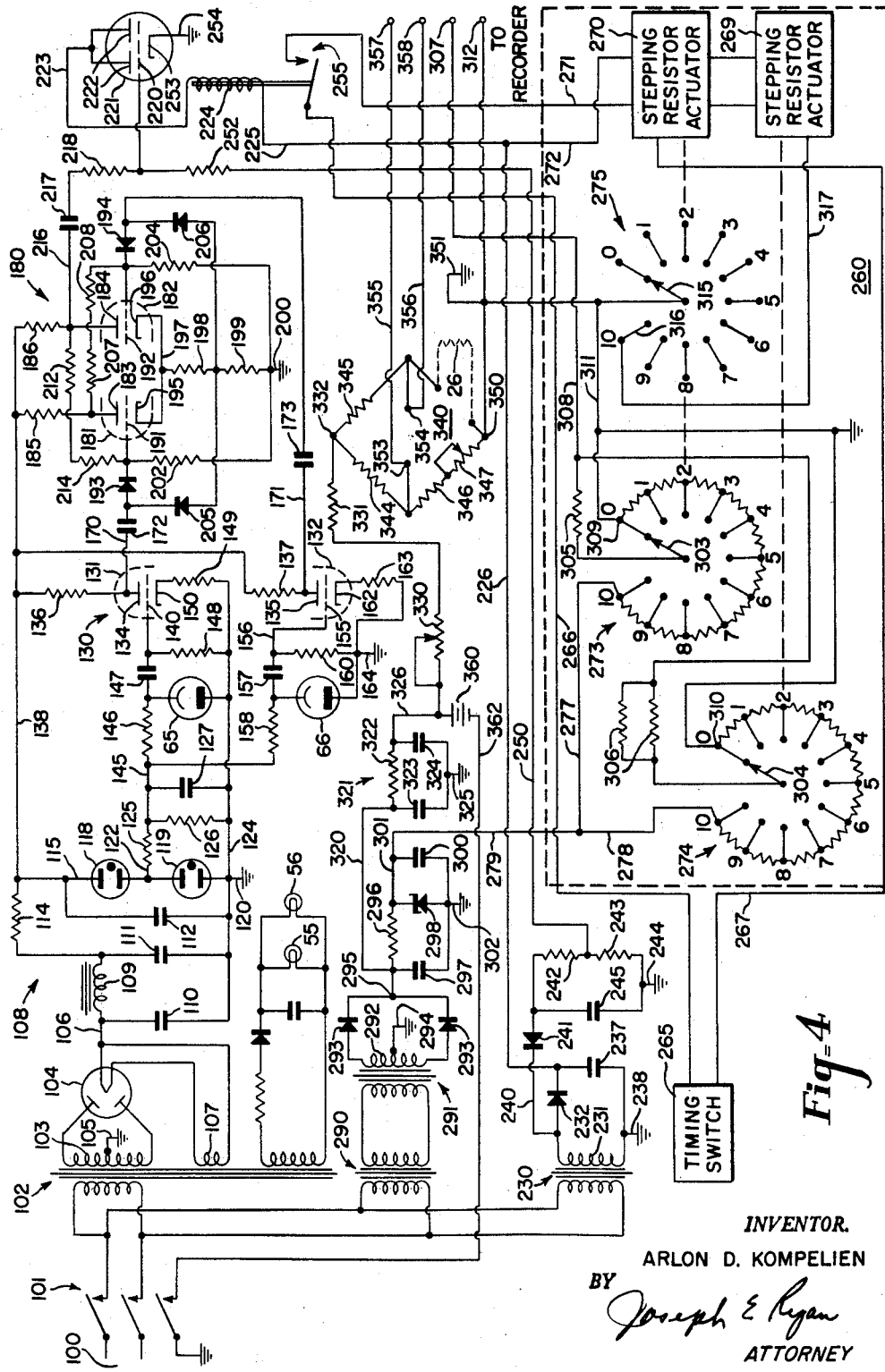

These and other objects of this invention will become apparent from a reading of the attached description together with the drawings, wherein:

FIGURE 1 is a schematic disclosure of the apparatus;
FIGURE 2 is a sectional view of a portion of the apparatus;
FIGURE 3 is a diagrammatic view of the composite transducer for the medical body function recorder;
FIGURE 4 is a schematic wiring diagram of the electrical portion of the apparatus.

The medical body function recorder shown schematically in FIGURE 1 includes basically a pneumatic and electrical system. The pneumatic system incorporates primarily a conduit or pipe 10 having connected thereto a bulb type hand pump 11 and a reservoir 12 with a meter 13 associated therewith. Conduit 10 extends through a detector member 20, which is a portion of the detecting apparatus, and continues on to a bulb-like probe member 21. The bulb-like probe member, shown in more detail in FIGURE 3, is generally larger than conduit 10. It is made of a soft, pliant material, such as rubber, and is flexible, having an enlarged undulated extremity 22 for purposes which will be later noted. The bulb-like probe 21 and the conduit 10, leading through the detector member 20 to the source or the pump 11, reservoir 12, and meter 13, provide a sealed pneumatic system through which air flows with collapse and expansion of the probe 21.

As will be seen in FIGURE 3, the bulb-like probe ending has an undulated surface indicated by a series of grooves therein with the shape of the main portion of the bulb being tapered with its largest extremity remote from the conduit. Projecting from the end is a solid portion indicated at 25, having a thermistor element 26 or a temperature sensitive resistor positioned therein and extending to the extreme end of the probe. The solid portion of the tube 25 is hollow to position or mount the thermistor. Electrical wiring extends through the body of the tube and the conduit leaving the conduit through a branch passage 28 and a fitting or coupling 30 which provides a passage for the wiring therethrough and seals the same. The main portion of the tube continues on in a connecting portion 32 which connects to the conduit or piping 10. The probe itself is designed to be inserted into the rectum of the patient upon which the body function is to be sensed and recorded. The probe is so shaped that when it is so inserted the large extremity would be positioned innermost in the anus and inflated such as to be retained within the rectum except for manual withdrawal. Further, the surfaces of the extremity 22 are undulated to provide small air passages along the surface of the same to permit the evacuation of gas in the intestines without removal of the tube.

The probe 21 which is collapsed and expanded by muscular contraction in the rectal region with breathing of the patient to which the probe is applied will cause movement of air through the pneumatic system in reversing directions with each muscular contraction. The sensing of this change in the direction of air flow is contained in the detector member 20 which acts as a pneumatic electric detector and which is shown in section in FIGURE 2. This detector member is basically a block 35 having a main passage or conduit 36 extending longitudinally therethrough. The extremities of the conduit 10 leading from the hand pump 11 and the probe 21 are connected thereto. As indicated in FIGURE 1, however, the conduit 10 can include a substantially long length of piping which would terminate at the probe through the connection 32 such that the detector member 20 and pneumatic source could be positioned considerably remote from the patient and associated with the electrical control apparatus at the recorder. As will be seen in FIGURE 2, the passage 36 includes a track member 38 positioned in the block, the track having turned-up extremities or stop means 40, 41 thereon designed to confine an opaque or translucent ball member 42 therein. While I have shown the passage 36 as a straight member with a track included therein, it will be understood that the passage may take a curved tubular form with stop means included therein. The ball or light blocking member is basically of such dimension as to freely roll back and forth on the track. The mass of ball 42 and its dimension relative to the passage 36 are such as to permit the ball to be moved readily back and forth within the passage 36 with minor air flow in the conduit and to reverse in direction of movement with reversal of air flow in the passage. Block 35 has also a pair of transversely extending passages 45, 46 which communicate with the passage 36 as light transmitting portions of the same and are positioned relatively adjacent or intermediate to the stop means 40, 41 of the track such that the ball will completely cover or block the passages 45, 46 as it rolls in the track before engaging the stop means. The passages 45, 46 mount light sources 55, 56 which are positioned on one side of the passage 36 and sealed therein. In the opposite extremities of the passages 45, 46 are mounted photocells 65, 66, respectively, which are positioned to respond to light from the sources 55, 56 except when the ball has moved adjacent one or the other of said passages 45, 46, at which time the light will be blocked to the respective photocell therein. The light sources and photocells are sealed respectively in the extremities of the passages 45, 46 to complete the pneumatic seal for the conduit 10. Thus, as will be seen in FIGURE 1, the detector means 20 has a plurality of electrical conduits or connections indicated generally at 67, 68 which connect the light sources and photocells therein to an apparatus indicated in block form at 70 in FIGURE 1 which includes the power supply, amplifier and counter shown in the wiring diagram of FIGURE 4. Similarly the wiring extending from the coupling 30 of the probe 21 is connected through conductors indicated generally at 72 to the apparatus 70 with the output therefrom leading through conductors indicated generally at 80 to an indicating recorder apparatus shown in block form and designed to record the medical body functions sensed by the apparatus. The electrical connections or cabling between the member 20, probe 21, recorder apparatus 85 and the apparatus 70 are shown generally in FIGURE 1 with the details of the connections between the elements being shown in the wiring diagram of FIGURE 4.

As will be seen more clearly in FIGURE 1 in connection with the schematic disclosure, detector member 20 is designed to be connected to the conduits through flexible tubing and is itself mounted through a pivotal mounting structure 90 such that the detector member will be positioned relatively horizontally. The specific purpose is to maintain the position of the track 38 horizontal such that the ball 42 therein is free to move back and forth within the conduit between the stop means 40, 41 independent of the effect of gravity. Thus the only movement imparted to the ball 42 should be from air flow through passage 36.

The pneumatic system is basically filled by operation of the hand pump 11 such that the lines or conduits 10, probe 21, and reservoir 12 are filled and adjusted to a certain predetermined pressure. This pressure is substantially low and, with breathing of the patient, air in the conduit will flow back and forth through passage 36 causing the ball 42 to move back and forth within the limits of the stop means. Thus, for example, with each inhalation of the patient, a muscular contraction applied to the probe 21 will cause the ball to move in one direction while exhalation and release of the contraction around the probe will permit the air flow from the reservoir back through the passage 36 to move the ball in the opposite direction. The ball is sufficiently small in mass to move within the limits with the air flow caused by contraction and expansion of the probe 21, and as it approaches the limits defined in the track it will pass in front of the passages 45, 46 to block light flow from the sources to the photocells. This will provide a switching action or change in impedance in the photocells which will operate a counter disclosed generally in the schematic diagram in FIGURE 4.

The power supply, amplifier and counter, shown in wiring diagram form in FIGURE 4, includes an alternating current supply indicated at 100 connected through an on-off switch 101 to a plurality of transformers, the first of which 102 has a secondary winding 103 connected to a full-wave rectifier tube 104. The rectifier tube has its cathode connected to a second secondary winding 107 to supply cathode heating current thereto. The grounded center tap 105 of the secondary winding 103 provides a return path for the rectified current. A conductor 106 leads from the cathode through a filter network 108 including an inductance 109, condensers 110, 111 and 112, and a resistor element 114 all connected in a conventional series parallel relationship. Thus the output of the rectifier is connected across a conductor 115 and a ground connection 120 with a pair of serially connected voltage regulator tubes 118, 119 positioned across the same for voltage regulation purposes. The regulated supply from the tubes 118, 119 is connected across conductors 122, 124 which are connected respectively to the midpoints of the tubes 118, 119 and the ground connection 120 and lead to a second filter network including resistors 125, 126 and condenser 127. The output of this filter network is connected to a dual triode amplifier tube. The dual triode is indicated generally at 130 and is, in effect, two separate amplifiers such as is indicated by the tube halves 131, 132. Tubes 131, 132 are controlled respectively by the photocells 65, 66. The respective tubes 131, 132 include plates 134, 135 connected through respective loading resistors 136, 137 to a conductor 138 leading to the ungrounded side of the filtered power supply or conductor 115. The grid 140 of the tube half 131 is connected to the filtered supply or conductor 145 through a resistor 146 and coupling condenser 147 with a grid leak resistor 148 connected between the grid and cathode 150. The cathode is connected to the ground conductor 124 through resistor 149 and the photocell 65 is connected between the ground conductor 124 and the filtered supply conductor 145, between the resistor 146 and the coupling condenser 147, to effect a variation in impedance or shorting across the input of the tube to perform the switching operation. Similarly, the tube half 132 has its grid 155 connected through a conductor 156, coupling condenser 157 and resistor 158 to the conductor 145 of the filtered supply with a grid leak resistor 160 connected between the grid and cathode 162 which is grounded as at 164 through resistor 163. The input to this tube includes the photocell 66 connected between the resistor 158 and the ground connection 164 to effect the shorting of the input of the tube for a variation in impedance on the supply to perform the switching operation. Plates 134, 135 of the respective tube halves are each connected through conductors 170, 171 and coupling condensers 172, 173 to a flip-flop switching stage indicated generally at 180. The flip-flop or switching stage is conventional and employs a dual triode or tube halves 181, 182 having plates 183, 184 which are connected through load resistors 185, 186 to the power supply conductor 138. Tube halves 181, 182 include grids 191, 192 which are connected respectively through rectifiers 193, 194 to the outputs of the dual amplifying stage 130 or coupling condensers 172, 173. The rectifiers are so poled that current flow would be in the direction to bias the respective grids. The tube halves 181, 182 include cathodes 195, 196 which are connected in common through a conductor 197 and a pair of bias resistors 198, 199 to a ground connection 200. Grid leak resistors 202, 204 are connected respectively between the grids 191, 192 and the ground connection. In addition, the cathode bias resistors have connected their midpoint to a second pair of rectifiers 205, 206, respectively, which are connected respectively to the input circuits of the triodes at condensers 172, 173, respectively. The polarity of rectifiers 205, 206 is reversed from that of rectifiers 193, 194 and the second rectifiers provide a reverse charging circuit for condensers 172, 173 to adjust the voltage level thereon. The flip-flop circuit includes conventional feedback loops connected between the grids and plates of the opposite tubes. Thus plate 183 is connected through resistors 207, 208 in a circuit to the grid 192 of tube 182 while the plate 184 of tube 182 is connected through resistors 212, 214 in a circuit leading to the grid 191 of tube 181. A single output circuit is taken from the flip-flop switching section, this being the output conductor 216 which is connected to plate 184 of tube 182 and through a coupling condenser 217 and biasing resistor 218 to a grid 220 of an amplifier relay tube 221. Tube 221 has its plates 222 connected through a conductor 223 to a relay coil 224 controlling the counter with the circuit being completed through conductors 225 and 226 to a positive voltage supply circuit including a transformer 230 connected across the conductors 100 and switch 101. The transformer 230 has its secondary winding 231 connected through a rectifier 232 to the conductor 226 with a filter condenser 237 connected across the transformer secondary and including a ground connection 238. The transformer 230 also supplies a negative voltage supply in the form of a circuit or conductor 240 connected to one side of the secondary winding 232 of transformer 230 and through an oppositely poled rectifier 241 to a pair of voltage dividing resistors 242, 243 connected to a ground connection 244 with a filter condenser 245 connected in parallel therewith. The center tap or midpoint of the biasing resistors 242, 243 is connected through a conductor 250 to a biasing resistor 252 leading to the grid 220 of the tube 221 to provide a negative bias on the grid in opposition to the bias from the flip-flop circuit through biasing resistor 218 such that operation of the relay and hence operation of the associated counter will take place only on a given output from the flip-flop circuit. It will be noted that only a single output connection is made in the flip-flop circuit such that it will operate the tube 221 which is an amplifier for relay coil 224 only after consecutive operations of both halves of the flip-flop circuit or after consecutive operations of the photocells 65, 66 such that the counting will take place only after the ball 42 in the pneumatic circuit has moved from one extremity of the track 38 to the opposite extremity. Tube 221 has its cathode 253 grounded as at 254. Further, the relay coil 224 associated with or energized by tube 221 is energized through a circuit which includes the power supply 230 and ground connections 238, 254. The relay coil upon energization controls the operation of a contact or switch 255 which performs a switching operation to control the operation of a counter 260 including actuators 269, 270, stepping resistors 273, 274 and a switch 275 which will be described in detail hereinafter. The relay contact 255 is connected through an externally positioned timing switch 265 which may or may not be included in the indicating recorder apparatus 85. Relay contact 255, when the timing switch 265 is closed, controls the energization or operation of the counter through a circuit which includes conductor 266, timing switch 265, conductor 267, stepping actuators 269, 270 shown in block form, and completed through a conductor 271 to the contact 255. This circuit controls the operation of the counter which is energized from the conductor 226 to the positive voltage power supply through the conductor 272 to coil portions of the actuators 269, 270 (not shown). The counter is shown herein as including two actuators 269, 270 operating respectively two circular potentiometers or stepping resistors indicated at 273, 274. Actuator 270 also includes a stepping switch 275. The associated wipers of these resistors and switch are actuated by the stepping actuators, these portions of the counter being conventional. Two actuators are used herein to increase the range of count with the switch 270 being operative to switch between the operation of the two. The stepping resistors 273, 274 are connected in parallel circuit connection through conductors 277, 278 to a common conductor 279 leading to a regulated power supply. This power supply includes a transformer 290 connected across the power supply 100 and switch 101 and to a second transformer 291 having a secondary winding 292 connected in series with a pair of rectifiers 293, in a conventional rectifier circuit, with a center tap on the secondary winding 292 grounded at 294. The rectifiers 293 are connected to the common connection 295 leading to a filter network including a resistor 296 and a condenser 297, a voltage regulating Zener diode 298 in parallel therewith and a second filter condenser 300 connected across the regulating diode 298 between a conductor 301 and a ground connection 302. The output of the power supply circuit is connected from the conductor 301 to the conductor 279 in the input side of the stepping resistors. This circuit provides for energization of the stepping resistors which are connected to the indicating recorder apparatus shown in block at 85 in FIG. 1. The stepping resistors 273, 274 include wipers 303, 304, respectively, which are connected through voltage dropping resistors 305, 306 respectively to a conductor 308 leading to an output terminal 307 of the apparatus and to the recorder apparatus. The opposite extremities of the respective stepping resistors, indicated at 309, 310, respectively, are connected in common into a ground conductor 311 to complete this parallel energizing circuit. The input to the recorder apparatus 85 for the respiratory rate signals is completed through a grounded conductor 311 leading to terminal 312 for the recorder. In addition, the stepping switch 275 has its wiper 315 connected to the ground conductor 311, and the end position on the stepping switch, indicated at 316, is connected through a conductor 317 to the actuator 269 to provide a switchover from one stepping resistor to the second stepping resistor after the complete range of movement has been accomplished in the first stepping resistor. Thus the two stepping resistors will function in such a manner that a given number of relay operations will advance the first stepping resistor 273 to its maximum voltage point at which time the switch 275 will reach its end position 316, energizing the interrupter circuit to provide for operation of the second stepping resistor wiper 304 upon continuous operation of the relay contacts 255. The sum voltage output appearing across the respective stepping resistors will be impressed across the amplifier output terminals 307, 312 to the input of the recorder apparatus 85 to give an indication of the number of operations of the relay 224.

In addition to the above, the transformer 291 and rectifier 293 power supply is also connected through a conductor 320 connected from the center tap 295 of the diodes to a filter network 321 composed of resistor 322 and condensers 323, 324, the network being grounded as at 325 and having an output lead 326 connected to voltage adjustment potentiometer 330 and a loading resistor 331 to an input diagonal or terminal 332 of temperature responsive bridge 340. Bridge circuit 340 is comprised of resistors 344, 345, 346, an adjustable resistor 347 and thermistor 26, positioned in the probe 21. A second input terminal 350 of the temperature responsive bridge is grounded as at 351 and output terminals 353, 354 of the bridge are connected through conductors 355, 356 to output terminals 357, 358 of the apparatus 70 leading to the recorder apparatus 85. In addition, the energization circuit for bridge circuit 340 includes a nickel cadmium cell indicated as a battery at 360 which is connected to the filter network at conductor 326 and voltage adjustment potentiometer 330, the cell being also connected through the conductor 362 and the power on-off switch 101 to a reference ground of the supply. The nickel cadmium cell operates as a low voltage reference or regulator to maintain the low voltage input supply to the body temperature bridge 340 which includes the thermistor 26 positioned in the probe 21. This portion of the apparatus is directly connected through the on-off switch for continuous energization and output to the recorder, the output being controlled by the thermistor 26 in the bridge circuit 340 in a conventional manner to provide a continuous indication of body temperature.

The improved medical body function recorder combines in a single sensing element apparatus for measuring respiratory rate and body temperature. The electric control system associated with the probe 21 or the primary sensing element senses flow of air through the pneumatic system with contraction and expansion of the probe 21 which, if applied to the rectum of the patient, will correspond to breathing, or expansion and contraction of the chest cavity. This reversal of flow with exhalation and inhalation, or contraction and expansion of rectal muscles, will cause the light blocking means or ball 42 in the portion of the pneumatic system to which the photocell light source detector is applied to effect a blockage of light falling upon the photocells 65, 66 to alter the condition of impedance of the same. The photocells are connected in an amplifying (130) and switching (180) circuits energized from a filtered source with the photocells 65, 66 connected across the source and in the grid circuit of the tubes of the amplifier to alter the bias of the grid circuits to perform a switching action in accordance with the light blockage or diverting function of the air flow responsive ball. The output of this amplifying stage is connected to the input of a flip-flop circuit 180 such that the switching action must take place between halves of the flip-flop circuit sequentially, thereby eliminating any sequential light blockage at the same photocell or response thereto. Thus the flip-flop circuit will respond only when the ball 42 in the track 38 of the pneumatic system has moved from one extremity of the track to the other, sequentially changing the light on the respective photocells to perform the switching operation. The flip-flop circuits 180 provides a single pulse output with the operation of both of the amplifier and flip-flop circuits to energize a relay amplifier and operate an associated relay connected to the counter. Thus each operation of the relay will control a stepping actuator of the counter associated with the stepping resistors and an associated stepping switch to advance the respective resistor and switch one step and change the voltage output therefrom in accordance with the number of relay operations. While there is shown a pair of stepping resistors herein, it should be understood that this portion of the apparatus is basically conventional and that a single stepping resistor may be utilized with an increased number of taps for a larger count range in place the dual unit shown herein. Further, other type of ratchet mechanism may be used in the counting operation, and the disclosure herein is intended to be illustrative only. The stepping resistors are energized from a regulated source so that incremental voltage changes with steps along the resistor will result in a proportioned signal output to the recorder apparatus 85 in accordance with the number of relay operations. The stepping resistors have associated therewith an external timing switch 265 so that the apparatus may be reset and relay operations may be counted over a given time period to provide a rate of breathing or respiration for the given period of time to be recorded.

The body temperature sensing thermistor 26 positioned in the probe 21 is connected in a bridge circuit 340 having a regulated supply 321 and an output connected directly to the recorder to provide a continuous record of body temperature.

In considering this invention, it should be remembered that the present disclosure is illustrative only and the scope of the invention should be determined only by the appended claims.

I claim as my invention:

1. In a respiratory rate measuring apparatus: a rectal probe including a sealed tubular conduit structure, a source of pneumatic pressure connected to said conduit structure of said probe and including a hand pump and a reservoir, a detection member having a tubular passage therein included in said conduit structure, a track included in said passage having stop means at the extremities thereof, an opaque ball positioned in said track being adapted to roll freely therein between said stop means, a pair of passages positioned in said detector member extending transversely of said tubular passage and connected thereto being located intermediate the stop means at the extremities of said track, a pair of light sources positioned in said last named passages in said detector member to one side of said tubular passage, photocell detecting means being positioned in said passages at the opposite side of the said tubular passage, said light sources and said photocells being sealed in said detector member to seal said tubular passage and being so aligned that the light from said sources is adapted to normally fall on said photocells except when said ball in said passage is positioned adjacent said transversely extending passages, flip-flop switching circuit means connected to said photocells and adapted to respond to the output of the same, and counting means connected to said switching means and operated in response to variation in output of said photocells as said ball interrupts the light from said sources.

2. In a respiratory rate measuring apparatus: a rectal probe including a sealed tubular conduit structure, a source of pneumatic pressure connected to said conduit structure and including a hand pump and a reservoir, a detector member having a tubular passage therein included in said conduit structure, a track included in said passage having stop means at the extremities thereof, means positioned in said track being adapted to move freely therein between said stop means, a pair of passages positioned in said detector member extending transversely of said tubular passage and connected thereto being located intermediate the stop means at the extremities of said track, a pair of light sources positioned in said last named passages in said detector member to one side of said tubular passage, photocell detecting means being positioned in said passages at the opposite side of said tubular passage, said light sources and said photocells being sealed in said detector member to seal said tubular passage and being so aligned that the light from said sources is adapted to normally fall on said photocells except when said means in said passage is positioned adjacent said transversely extending passages, flip-flop switching circuit means connected to said photocells and adapted to respond to the output of the same, and counting means connected to said switching means and operated in response to variation in output of said photocells as said means interrupts the light from said source.

3. In a respiratory rate measuring apparatus: a rectal probe including a sealed tubular conduit structure, a pneumatic pressure system connected to said tubular conduit structure, a detector member having a tubular passage included in said conduit structure, a track included in said tubular passage having stop means at the extremities thereof, means positioned in said track being adapted to move freely therein between said stop means, a pair of passages positioned in said detector member extending transversely of said tubular passage and connected thereto being located between the stop means at the extremities of said track and in spaced relationship, a pair of light sources positioned in said last named passages in said detector member to one side of said tubular passage, photocell detecting means being positioned in said passages at the opposite side of said tubular passage, said light sources and said photocells being sealed in said detector member to seal said tubular passage and being so aligned that the light from said sources is adapted to normally fall on said photocells except when said means in said passage is positioned adjacent said transversely extending passages, flip-flop switching circuit means connected to said photocells and adapted to respond to the output of the same, and counting means connected to said switching means and operated in response to variation in output of said photocells as said means interrupts the light from said sources.

4. In a respiratory rate measuring apparatus: a rectal probe including a sealed tubular conduit structure, a source of pneumatic pressure connected to said conduit structure and including a hand pump and a reservoir, a detector member having a tubular passage therein included in said conduit structure, a track included in said passage having stop means at the extremities thereof, a means positioned in said track being adapted to move freely therein between said stop means with reversible flow of air in said conduit structure as said probe is collapsed and expanded, a light source and photocell detecting means positioned in transversely extending passages in said detector member communicating with said tubular passage, said light source photocell detector being sealed in said detector member and adapted to be operated when said means in said tubular passage is moved to block said transversely extending passages, flip-flop switching circuit means connected to said detecting means and adapted to respond to the output of the same, and counting means connected to said switching means and operated in response to the output of said detecting means as said means moves between said stop means in said tubular passage.

5. In a respiratory rate measuring apparatus: a rectal proble including a sealed tubular conduit structure, a pneumatic pressure system connected to said tubular conduit structure, a detector member having a tubular passage included in said conduit structure, a track included in said tubular passage having stop means at the extremities thereof, an opaque ball positioned in said track being adapted to roll freely therein between said stop means with reversible flow of air in said conduit structure as said probe is collapsed and expanded, a light source and photocell detecting means positioned in said detector member, said detecting means being operative to sense the rolling of said ball in said tubular passage between said stop means with reversed direction of air flow therein, flip-flop switching circuit means connected to said detecting means and adapted to respond to the output of the same, and counting means connected to said switching means and operated in response to operation of said detecting means as said ball interrupts the light from said source to the photocells.

6. In a respiratory rate measuring apparatus: a rectal probe including a sealed tubular conduit structure, a pneumatic pressure system connected to said conduit structure, a detector member having a tubular passage included in said conduit structure, a track included in said tubular passage having stop means at the extremities thereof, means positioned in said track being adapted to move freely therein between said stop means, a pair of passages positioned in said detector member extending transversely of said tubular passage and connected thereto being located adjacent the stop means at the extremities of said track, a pair of light sources positioned in said last named passages in said member to one side of said tubular passage, photocell detecting means being positioned in said passages at the opposite side of said tubular passage, said light sources and said photocell means being sealed in said detector member to seal said tubular passage and being so aligned that the light from said sources is adapted to operate said photocell means except when said ball in said passage is positioned adjacent said transversely extending passages, circuit means connected to said photocell means and operated with operation of said photocell means, and counting means connected to said circuit means and operated with changes in operation of said photocell means as said ball interrupts the light from said sources.

7. In a respiratory rate measuring apparatus: a rectal probe including a sealed tubular conduit structure, a pneumatic pressure system connected to said conduit structure, a detector member having a tubular passage included in said conduit structure, a track included in said tubular passage having stop means at the extremities thereof, means positioned in said track being adapted to move freely therein between said stop means, a pair of passages positioned in said detector member extending transversely of said tubular passage and connected thereto being located adjacent the stop means at the extremities of said track, a pair of light sources positioned in said last named passages in said detector member to one side of said tubular passage, photocell detecting means being positioned in said passages at the opposite side of said tubular passage, said light sources and said photocell detecting means being sealed in said detector member to seal said tubular passage and being so aligned that the light from said sources is adapted to operate said photocell detecting means except when said ball in said passage is positioned adjacent said transversely extending passages, circuit means connected to said photocell detecting means and operated with operation of said detecting means, counting means connected to said circuit means and operated with changes in operation of said photocell detecting means as said ball interrupts the light from said sources, and recorder means connected to and operated by said counting means.

8. In a medical body function recorder: a rectal probe including a sealed tubular conduit structure, a thermistor sealed in said probe, a pneumatic pressure system connected to said conduit structure, a detector member having a tubular passage included in said conduit structure, a track included in said tubular passage having stop means at the extremities thereof, means positioned in said track being adapted to move freely therein between asid stop means, a pair of passages positioned in said detector member extending transversely of said tubular passage and connected thereto being located intermediate the stop means at the extremities of said track, a pair of light sources positioned in said last named passages in said detector member to one side of said tubular passage, photocell detecting means being positioned in said passages at the opposite side of said tubular passage, said light sources and said photocells being sealed in said detector member to seal said tubular passage and being so aligned that the light from said sources is adapted to operate said photocells except when said ball in said passage is positioned adjacent said transversely extending passages, circuit means connected to said photocells and operated with operation of said photocells, counting means connected to said circuit means and operated with changes in operation of said photocells as said ball interrupts the light from said sources, circuit means connected to said thermistor means and operated to produce a signal output in proportion to the temperature of said thermistor, and recorder means connected to said counting means and said circuit means and operated thereby.

9. In a medical body function recorder system, a sealed pneumatic conduit system, a collapsible probe included in said pneumatic conduit system, portions of said conduit system being light conducting, means positioned in said portions of said conduit adapted to be movable along its extent over a predetermined range of movement with movement of air through said pneumatic conduit system upon collapse and expansion of said probe, light source photoelectric type detecting means positioned in said portions of said conduit system and operative to produce output signals whenever said movable means in said conduit system approaches said limits of movement with collapse and expansion of said probe, and means recording the operation of said detecting means.

10. In a respiratory rate measuring system, a sealed pneumatic conduit system, a collapsible probe included in said pneumatic conduit system, movable ball means positioned in a portion of said conduit system adapted to be movable along its extent over a predetermined range of movement with movement of air through said pneumatic conduit system upon collapse and expansion of said probe, further means associated with said portion of said conduit system and operating in response to said movements of said movable ball means to detect movement of said movable ball means therein, and means recording the operation of said detecting means.

11. In a respiratory rate measuring system, a sealed pneumatic conduit system, a collapsible probe included in said pneumatic conduit system, movable ball means positioned in a portion of said conduit system adapted to be movable along its extent over a predetermined range of movement with movement of air through said pneumatic conduit system upon collapse and expansion of said probe, further means associated with said portion of said conduit system and operating in response to said movements of said movable ball means to detect movement of said movable ball means therein, temperature measuring means positioned in part in said collapsible probe and adapted to respond to the ambient temperature of said probe, and means connected to said detecting means and said temperature measuring means and recording the operation of said temperature measuring means and said detecting means.

References Cited in the file of this patent

UNITED STATES PATENTS

| | | |
|---|---|---|
| 2,012,112 | States | Aug. 20, 1935 |
| 2,047,665 | Beggs | July 14, 1936 |
| 2,082,941 | Burnside | June 8, 1937 |
| 2,494,393 | Lamson | Jan. 10, 1950 |
| 2,507,858 | Kegel | May 16, 1950 |
| 2,652,825 | Rauh | Sept. 22, 1953 |